US008806060B2

(12) United States Patent　　(10) Patent No.: US 8,806,060 B2
Page et al.　　(45) Date of Patent: Aug. 12, 2014

(54) INFORMATION RETRIEVAL SYSTEM

(75) Inventors: David R. Page, Romsey (GB); Birgit Schmidt-Wesche, Winchester (GB)

(73) Assignee: International Business Machines Corporation, Armonk, NY (US)

(*) Notice: Subject to any disclaimer, the term of this patent is extended or adjusted under 35 U.S.C. 154(b) by 2124 days.

(21) Appl. No.: 10/095,413

(22) Filed: Mar. 12, 2002

(65) Prior Publication Data

US 2003/0177265 A1　　Sep. 18, 2003

(51) Int. Cl.
| | | |
|---|---|---|
| G06F 15/16 | (2006.01) | |
| G06F 3/00 | (2006.01) | |
| G06F 9/44 | (2006.01) | |
| G06F 9/46 | (2006.01) | |
| G06F 13/00 | (2006.01) | |
| G06F 17/00 | (2006.01) | |
| G06F 17/20 | (2006.01) | |
| G06F 17/21 | (2006.01) | |
| G06F 17/22 | (2006.01) | |
| G06F 17/24 | (2006.01) | |
| G06F 17/25 | (2006.01) | |
| G06F 17/26 | (2006.01) | |
| G06F 17/27 | (2006.01) | |
| G06F 17/28 | (2006.01) | |

(52) U.S. Cl.
USPC ............................ 709/245; 719/311; 715/206

(58) Field of Classification Search
USPC ......................................... 709/201, 217, 218
See application file for complete search history.

(56) References Cited

U.S. PATENT DOCUMENTS

| | | | | |
|---|---|---|---|---|
| 5,918,237 A | * | 6/1999 | Montalbano | 715/206 |
| 5,938,726 A | * | 8/1999 | Reber et al. | 709/217 |
| 5,963,964 A | * | 10/1999 | Nielsen | 715/255 |
| 6,023,701 A | * | 2/2000 | Malik et al. | 707/10 |
| 6,025,844 A | * | 2/2000 | Parsons | 715/805 |
| 6,037,934 A | * | 3/2000 | Himmel et al. | 715/760 |
| 6,049,812 A | * | 4/2000 | Bertram et al. | 715/516 |
| 6,144,991 A | * | 11/2000 | England | 709/205 |
| 6,182,113 B1 | * | 1/2001 | Narayanaswami | 709/203 |
| 6,184,886 B1 | * | 2/2001 | Bates et al. | 715/760 |
| 6,393,462 B1 | * | 5/2002 | Mullen-Schultz | 709/206 |
| 6,460,038 B1 | * | 10/2002 | Khan et al. | 1/1 |
| 6,496,829 B1 | * | 12/2002 | Nakamura | 1/1 |
| 6,526,424 B2 | * | 2/2003 | Kanno et al. | 715/229 |
| 6,546,393 B1 | * | 4/2003 | Khan | 1/1 |
| 6,567,104 B1 | * | 5/2003 | Andrew et al. | 715/762 |
| 6,970,867 B1 | * | 11/2005 | Hsu et al. | 1/1 |

OTHER PUBLICATIONS

"A Double Edged Sword", Mar. 15, 1996, Semantic Studios, p. 1-4, <http://semanticstudios.com/publications/web_architect/frames.html>.*

(Continued)

*Primary Examiner* — Azizul Choudhury
(74) *Attorney, Agent, or Firm* — Steven M. Greenberg, Esq.; CRGO Law

(57) ABSTRACT

A web browsing system for retrieving a web page whereby the web page comprises associated frames, content data and context data (e.g. navigational buttons, hyperlinks to other web pages etc.). The system is usable with a distributed data processing system comprising a server computer and a client computer, whereby the web page is stored on the server computer and is transmitted over a network to the client computer. The web browsing system comprises a function for providing a bookmark to the web page and also comprises a function to retrieve the bookmark. Once a bookmark has been retrieved, the web page and the structure of the web page, namely, the plurality of frames, the content data and the context data are displayed.

15 Claims, 16 Drawing Sheets

(56) References Cited

OTHER PUBLICATIONS

Nakajima, Shinsuke et al. "Context-Dependent Web Bookmarks and Their Usage as Queries," Dec 2002, IEEE, pp. 333-341.*

Samad, Tariq and Israel, Peggy, "A Browser for Large Knowledge Bases Based on a Hybrid Distributed/Local Connectionist Architecture," Mar. 1991, IEEE, vol. 3, Issue 1, pp. 89-99.*

* cited by examiner

| 705 | 710 | 715 |
|---|---|---|
| 0 | "Overview" | http:/directory/file1html |
| 1 | "Starting" | http:/directory/file2html |
| 2 | "Help" | http:/directory/file3html |
| 3 | | |
| 4 | | |
| 5 | | |
| 6 | | |

```
function addRemoveBookmark()
{
bookmarkNumber = getBookmark(href);      //* Look for the bookmark
                                            with this URL *//

//* Delete or add the
                                            bookmark *// if (bookmarkNumber>-1)
      delete bookmark[bookmarkNumber];
   else
      bookmark[bookmark.length]
      = new defineBookmark(main.location.href,
main.document.title);

//* Reload the navigation
                                            panel *// navigation.location.reload();

//* Return 'false' to stop
                                            the hyperlink *//
return false;

```
function getBookmark(href)

{
        for (b in bookmark)              //* Look through all bookmarks
*// if (href==bookmark[b].href)      //* If bookmark is found
*// return b;                         //* then return its index
*// return -1;                        //* If bookmark was not found,
                                          indicate this to the user
*//
}
```

FIG. 11

| 0 | | |
|---|---|---|
| 1 | "Starting" | http:/directory/file2html |
| 2 | "Help" | http:/directory/file3html |
| 3 | | |
| 4 | | |
| 5 | | |
| 6 | | |

```
function listBookmarks()
{
    for (b in bookmark)
        {
            text = '<p>'
                +   '<a target="main" href="'+bookmark[b].href+'">'
                -     bookmark[b].title
                +   '<\/a>'
                + '<\/p>';
            document.writeln(text);
        }
}
```

FIG. 13

| 0 | | |
|---|---|---|
| 1 | "Starting" | http:/directory/file 2html |
| 2 | "Help" | http:/directory/file 3html |
| 3 | "Summary" | http:/directory/file 4html |
| 4 | | |
| 5 | | |
| 6 | | |

1400

INFORMATION RETRIEVAL SYSTEM

TECHNICAL FIELD OF THE INVENTION

The present invention relates to information retrieval in an information network and more particularly, to bookmarking web pages.

BACKGROUND OF THE INVENTION

The World Wide Web is the Internet's multimedia information retrieval system. In the Web environment, client machines communicate with Web servers using the Hypertext Transfer Protocol (HTTP). The web servers provide users with access to files such as text, graphics, images, sound, video, etc., using a standard page description language known as Hypertext Markup Language (HTML). HTML provides basic document formatting and allows the developer to specify connections known as hyperlinks to other servers and files. In the Internet paradigm, a network path to a server is identified by a Uniform Resource Locator (URL) having a special syntax for defining a network connection. So called web browsers, for example, Netscape Navigator (Netscape Navigator is a registered trademark of Netscape Communications Corporation) or Microsoft Internet Explorer (Internet Explorer is a trademark of Microsoft Corporation), which are applications running on a client machine, enable users to access information by specification of a link via the URL and to navigate between different HTML pages.

FIG. 1 shows an example of a typical web browser graphical user interface ("GUI") display on a browser computer. On a portion (100) of a user's computer display, a web browser (110), in this example Netscape Navigator, runs in its own window. In FIG. 1, the web browser displays the top-level or home page of a web site, the web site address being indicated by the URL http://www.corp.com in the location bar (140). This web page, "index.htm", is configured to split the GUI display into three frames, whereby each frame is associated with a separate URL and each frame displays a separate document. Frames are a feature in HTML, allowing the display to be split into rectangular areas. The upper frame (120) is used to display a general banner, the left frame (130) is used to display a list of hyperlinks from the top-level web page (or navigation bar), and the right bottom frame (150) displays the contents of the currently selected web page. The top of the web browser display includes a row of control icons, including a "back" button (160) and a "forward" button (170). Additionally, a domain history button (180) provides a drop down history list of the URLs of web sites most recently visited via the browser application.

When the user of the web browser selects a link, the client machine issues a request to a naming service to map a hostname (in the URL) to a particular network IP (Internet Protocol) address at which the server machine is located. The naming service returns an IP address that can respond to the request. Using the IP address, the web browser establishes a connection to a server machine. If the server machine is available, it returns a web page. To facilitate further navigation within the site, a web page typically includes one or more hypertext references ("HREF") known as "anchors" or "links".

In FIG. 2, a typical tree-like hierarchical organisation of links within a web site is shown, where a given link (200) typically points to other Web resources (210, 215), and those resources may point to further resources (220, 222, 224, 226, 228). Thus, a given top-level link often has an associated set of lower level links, which may point to still more resources located across many different servers in the network. Navigation through multiple levels of links is often very difficult. The goal of many users of the Internet is to "drill down" to a given piece of information that represents some desired content. Because HTML pages are often statically coded, however, a user often has little choice but to load successive web pages in search of a given web of interest. This approach is time consuming, and it often results in the user either terminating the navigation of a particular web site or simply not finding the relevant content. Additionally, when traversing these multiple levels of links, the user often loses track of the sequence of links used to arrive at a particular web page of interest. Thus, the user could have difficulty in returning to a particular web page after further web pages have been subsequently browsed.

A bookmark facility is one way of addressing this problem by providing a mechanism to store and recall specific user-selected web pages of interest. This simplifies the user's future access to these book-marked web pages. Each bookmark comprises the title of a single web page and the URL used to access the web page. Additionally, bookmarks often comprise the date on which the web page was last visited and the date on which the web page was book-marked, along with additional information.

One example of the process of bookmarking a web page will now be described, with reference to FIG. 3. The browser (110) of FIG. 1, further comprises a button (300), which allows a user to initiate the bookmarking process. Once a user has clicked on the button (300) a menu (305) is displayed, the menu comprising functions such as "Add Bookmark" and also, a list of items that represent the current bookmarks (e.g. "test.com"). In this example, when a user adds a web page (with an associated URL http://www.corp.com) as a bookmark by clicking on the "Add Bookmark" function, an item (310) appears at the bottom of the list. The user can re-visit the "corp.com" web page in the future by clicking on the item (310) in the menu (305). Therefore, the item (310) serves as a pointer to the web page. Another method of bookmarking is initiated by clicking on the right mouse button in the right bottom frame (150) in FIG. 1. This operation brings up a menu comprising functions such as "Add Bookmark", whereby clicking on the "Add bookmark" function adds a web page to the list.

Whilst the bookmark function gives the user certain limited flexibility in revisiting web pages, one problem with current bookmark technology is that navigating to a bookmarked page requires at least two operations: one operation to activate the browser's bookmarking function (e.g. menu (305)) and another operation to select the web page required from the list of bookmarked web pages (e.g. via an item (310)). Typically, the two operations can be combined into a single operation by selecting the bookmark button (300) (one operation) and then holding the left mouse button down whilst dragging it over the menu (305). However, this single operation may be time consuming especially if the web page that has been bookmarked is present as an item in a sub-list of the main bookmark list and therefore further delay is incurred while the browser brings up the sub-list.

Another problem arises when a web page supports frames. In FIG. 3, a first URL is associated with the entire collection of frames (315) (the frame set)—in this example, URL http://www.corp.com; a second URL is associated with the upper frame (320); a third URL is associated with the left frame (325) and a fourth URL is associated with the right bottom frame (330). Existing browser implementations can preserve individual web pages with bookmarks, but the method for doing so permits only a single page reference for each bookmark.

Therefore, when a web page is bookmarked from a view that utilizes frames, that view is lost when a user re-visits that web page. Additionally, if a frame comprises any references to other frames, these references will be invalid and if a frame provides navigational information and buttons etc., then these functions will be lost when the bookmarked web page is re-displayed.

As an example, if a user "drills down" to a web page that was then bookmarked utilizing the browser function as described above, the first URL (referencing the top level web page of the web site i.e. the home page) is stored. Therefore, when a user tries to re-visit that particular web page, the web browser re-loads the home page instead. Alternatively, if the web page was bookmarked by utilizing the right mouse button, the fourth URL is stored and any information in the surrounding frames (i.e. the frame set, upper frame or left frame) is lost. Therefore, this can result in significant loss of contextual information, content and any frame structure intended by information suppliers.

Therefore there is a need for an improved method of bookmarking whereby the number of operations required in order to retrieve a bookmarked page is reduced and also, the frame structure of web pages is preserved.

SUMMARY OF THE INVENTION

According to a first aspect, the present invention provides a web browsing system for retrieving a web page, said web page comprising a plurality of frames, content data and context data, for use in a distributed data processing system, said distributed data processing system comprising: a server computer and a client computer, said web page being stored on said server computer and transmitted over a network to said client computer, said system comprising: means, at said server computer, for providing a bookmark to said web page; means for retrieving said bookmark, whereby in response to said retrieving means, said web page, said plurality of frames, said content data and said context data are displayed.

A web browsing application is preferably used for navigating to a web page. In a preferred embodiment, the means for providing a bookmark is activated by clicking on an associated icon. A single icon could be provided for adding or deleting a bookmark, or two separate icons could be implemented. In the preferred implementation, bookmarks are stored as items in an array and the array is either stored for one instantiation of the web browsing application or for more than one instantiation of the web browsing application. If the latter case were to be implemented, "cookies" are utilised and this is described in more detail later.

Preferably each item of the array comprises: an index number into the array; a title associated with the web page and a URL associated with the web page. The means for retrieving a bookmark is implemented via a bookmark list, whereby each bookmark is a separate item in the list. This is advantageous in that a user has a comprehensive view of a number of web pages (more specifically, pointers to the web pages). Once a bookmark is retrieved, it is displayed in a data display area and beneficially, the structure (context of the frames etc.) and the content (data within the frames) of the web page is preserved.

According to a second aspect, the present invention provides a method of retrieving a web page, said web page comprising an associated plurality of frames, content data and context data, for use in a distributed data processing system, said distributed data processing system comprising: a server computer and a client computer, said web page being stored on said server computer and transmitted over a network to said client computer, said method comprising the steps of: providing a bookmark to said web page; retrieving said bookmark; in response to retrieving a bookmark, causing said web page and said associated plurality of frames, said content data and said context data to be displayed.

According to a third aspect, the present invention provides a computer program product in a computer readable medium, for retrieving a web page, said web page comprising an associated plurality of frames, content data and context data, for use in distributed data processing system comprising: a server computer and a client computer, said web page being stored on said server computer and transmitted over a network to said client computer, the computer program product comprising: means for providing a bookmark to said web page; means for retrieving said bookmark; means, in response to retrieving a bookmark, for causing said web page and said associated plurality of frames, said content data and said context data to be displayed.

BRIEF DESCRIPTION OF THE DRAWINGS

The present invention will now be described, by way of example only, with reference to preferred embodiments thereof, as illustrated in the following drawings:

FIG. 7 shows a representation of an array, whereby information related to bookmarks is stored as items in the array, according to the present invention;

FIG. 10 shows an example of a function for adding or deleting a bookmark, according to the present invention;

FIG. 11 shows an example of a function for retrieving a bookmark, according to the present invention;

FIG. 12 shows a representation of an array, following the process of deleting a bookmark, according to the present invention;

FIG. 13 shows an example of a function for displaying the current list of bookmarks, according to the present invention.

DETAILED DESCRIPTION OF THE INVENTION

Figure 1:
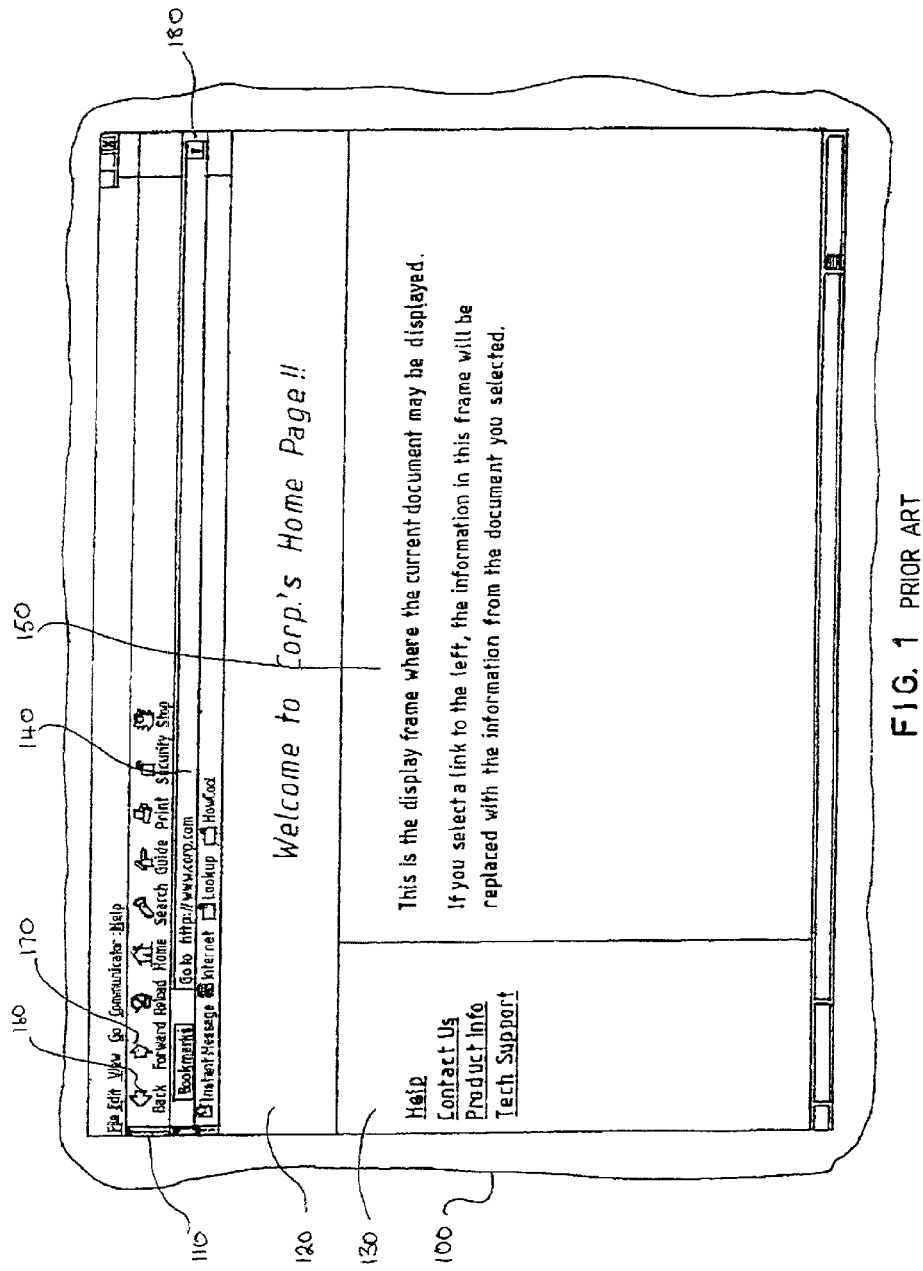
FIG. 1 shows a prior art example of a typical web browser graphical interface.
Figure 2:
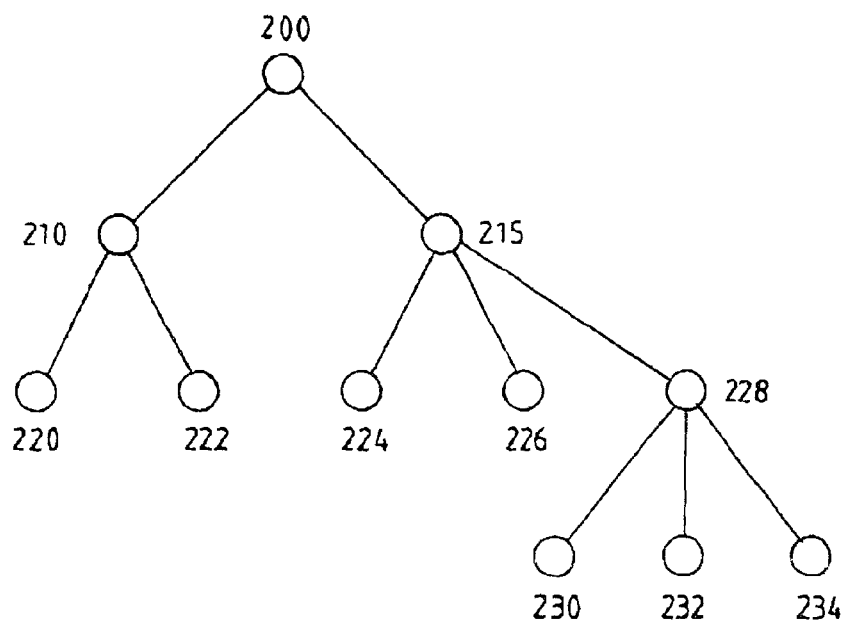
FIG. 2 shows a prior art tree structure of hyperlink relationships usable in the web browser of FIG. 1.
Figure 3:
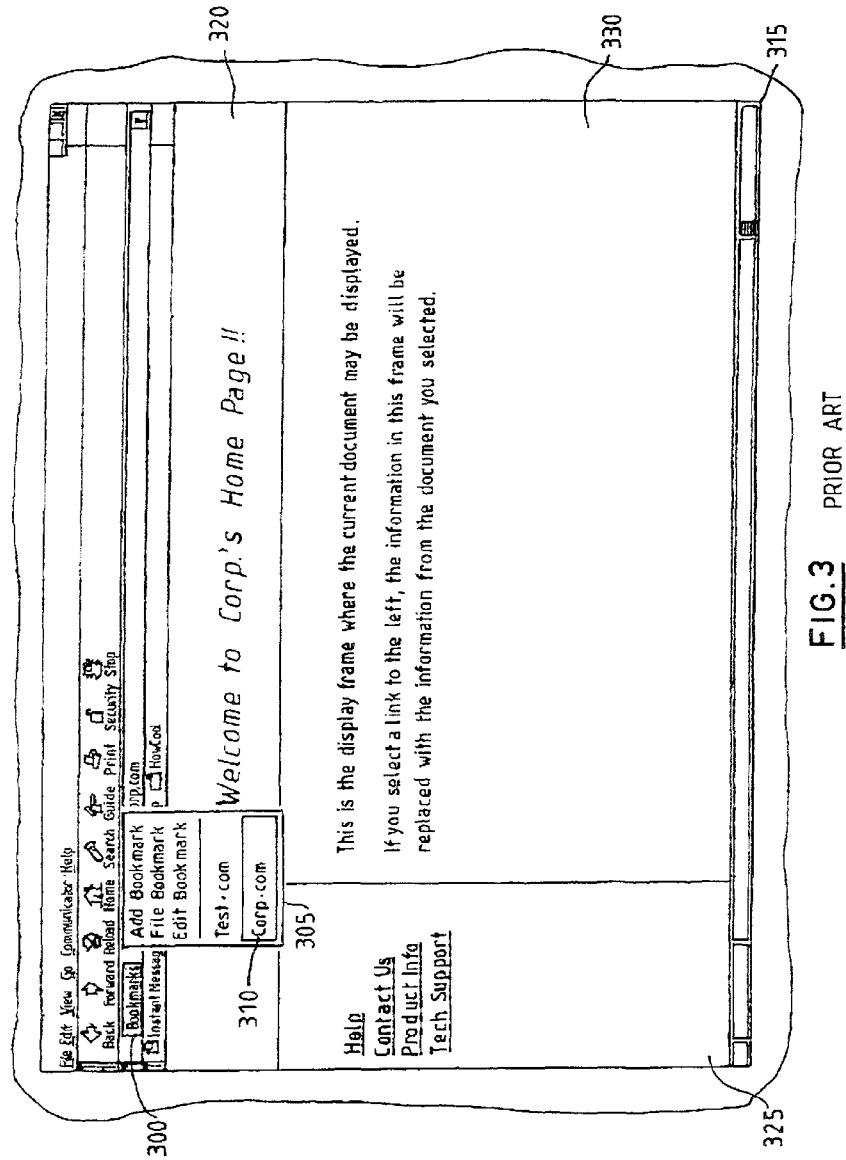
FIG. 3 shows a prior art bookmarking function usable in the web browser of FIG. 1.
Figure 4:
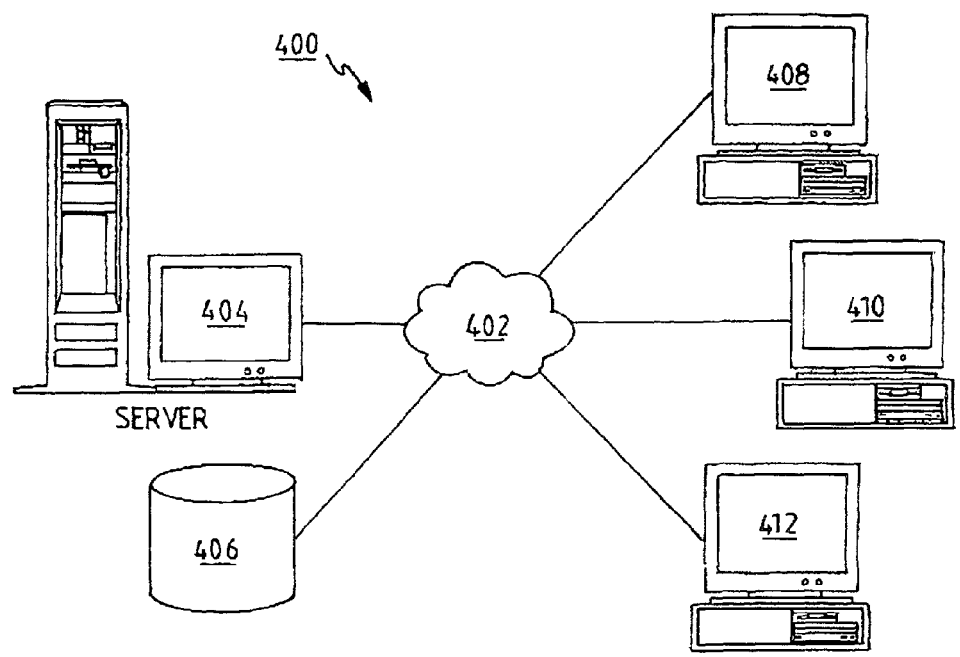
FIG. 4 shows a prior art distributed data processing system in which the present invention may be implemented.

FIG. 4 shows a pictorial representation of a distributed data processing system in which the present invention may be implemented. Distributed data processing system (400) comprises a number of computers, connected by a network (402). Server machine (404) is connected to network (402) along with storage unit (406) and client machines (408), (410) and (412). In the depicted example, distributed data processing system (400) is the Internet, with network (402) representing a world-wide collection of networks and gateways that use the transmission control protocol over internet protocol (TCP/IP) suite of protocols to communicate with one another.

In a preferred embodiment of the present invention, an improved information centre is described. Information centres are online collections of documents based on HTML web browsers. The information centres provide easy access to large libraries of softcopy information about particular products, such as help and support information, via a simple interface.

Figure 5A:
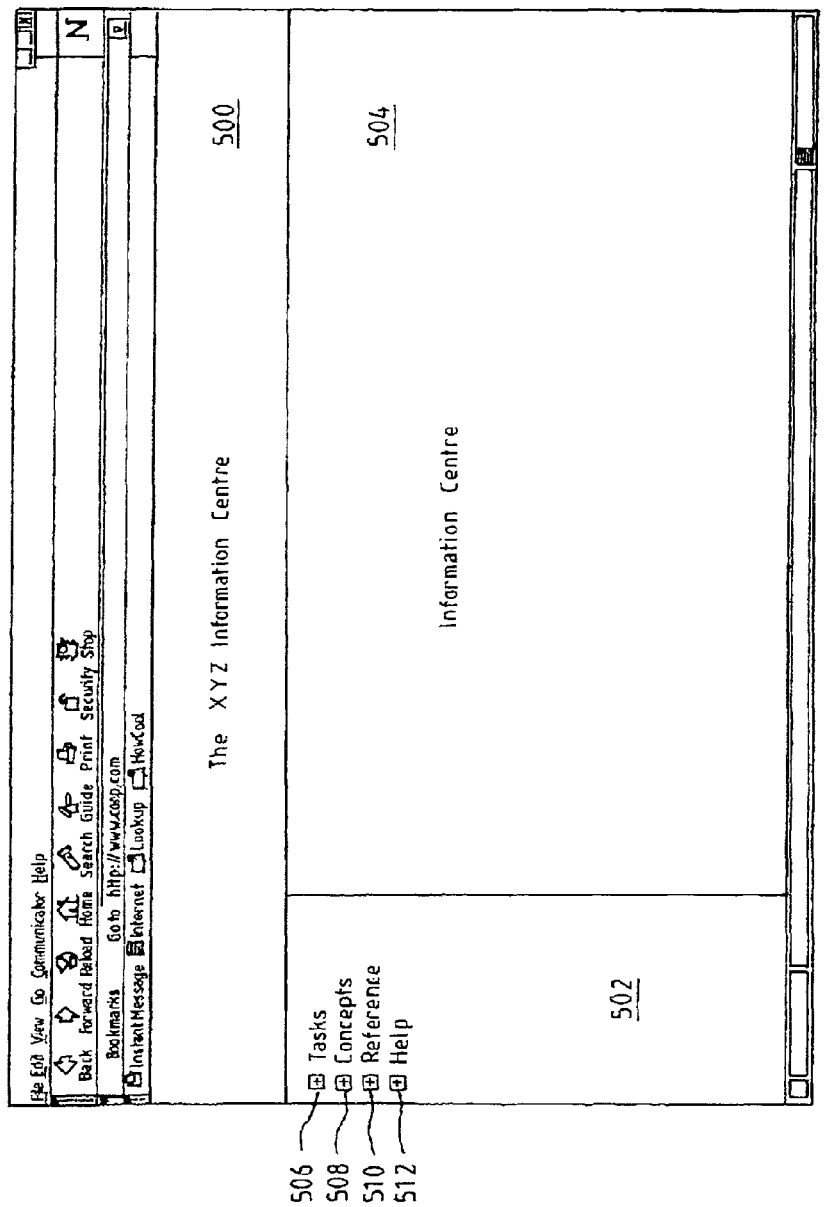
FIG. 5A shows a prior art information centre.

FIG. 5A shows a typical interface of a current information centre, which is supported by a web browser. The upper frame (500) comprises a title and other high-level items of information and links. Below the upper frame (500), the left frame (502) comprises a navigation bar, displaying links to information units. Upon selection of a link, an associated information unit is displayed in the right bottom frame (504).

In this example, in order to assist users to find information easily, the information units are divided into various categories. Referring to the navigation bar (502), categories "Tasks", "Concepts", "Reference" and "Help" are shown. To the left of each category, an icon (506, 508, 510, 512) is displayed, whereby selection of the icon will display sub-categories. It should be understood that the term icon also covers graphic symbols such as tabs and buttons.

When using an information centre such as the one in FIG. 5A, only a single information unit can be displayed at any one time in the right bottom frame (504). If a further information unit is to be displayed, the first is discarded and replaced completely by the new information unit. Frequently, it will be necessary to navigate to the new information unit using the navigation tree in the navigation bar (502), whereby the navigation tree can be opened to a given level and closed to a given level.

Figure 5B:
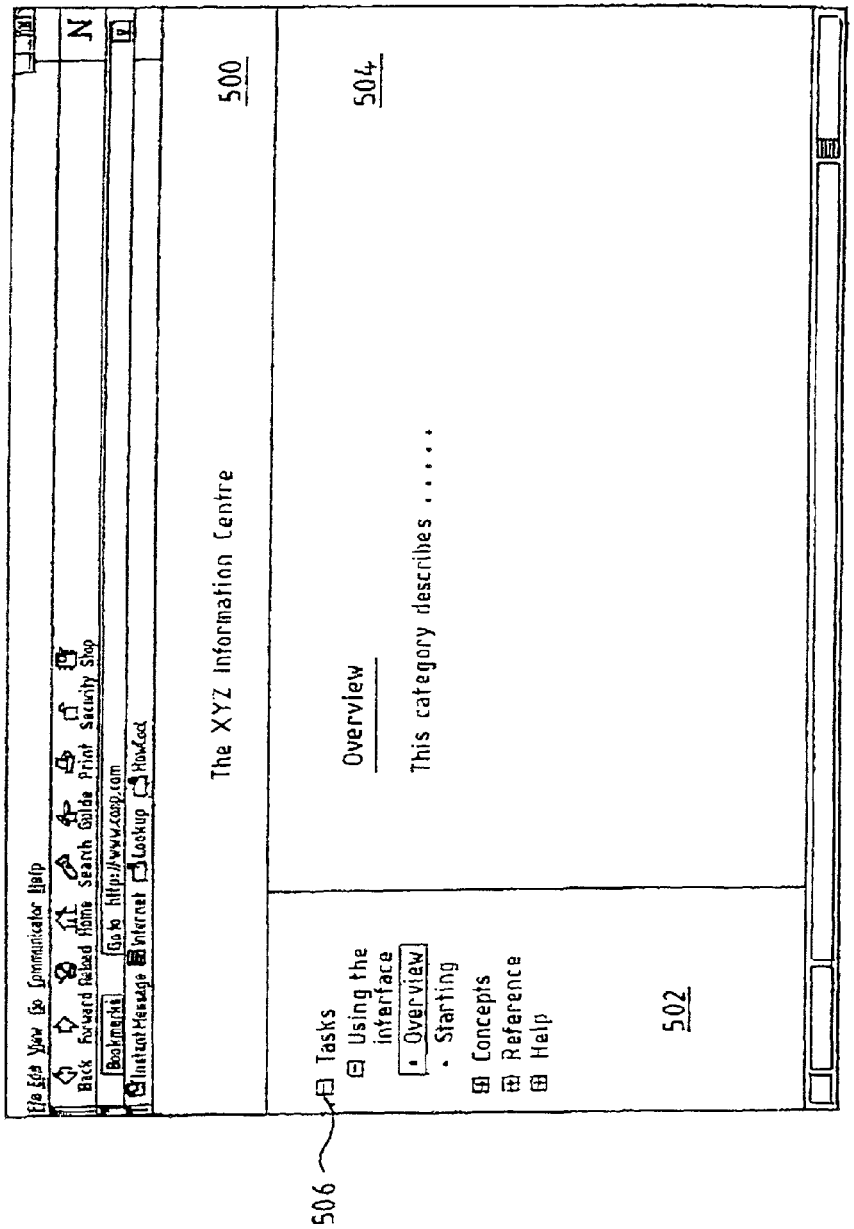
FIG. 5B shows the results of navigation operations performed on the information centre of FIG. 5A.

Referring to FIG. 5B once a user clicks on an icon (506) to expand the category "Tasks" further sub-categories are displayed. Subsequently the user clicks to expand one of these sub-categories, namely, "Using the Interface" and then clicks to expand an information unit, namely, "Overview". This information unit is now displayed in the right bottom frame (504). If there are no sub-categories for selection under the top-level category, the user may click directly on an information unit. However, if there are no information units for selection, the user has the option to click either on a different top-level category or a sub-category, in order to continue with the navigation operations.

It should be understood that in order to bookmark the "Overview" information unit, currently, a user activates the bookmark function and then adds a pointer (i.e. an item in a list) to that information unit. As described above, the current technology is disadvantageous in that several operations are required in order to retrieve a bookmarked page. Furthermore, in cases where a web page supports frames, there is loss of context (and content).

In a preferred embodiment of the present invention, a technique is provided for bookmarking web pages via computer program code downloaded from the web site itself, rather than via a web browser. Preferably, the technique is implemented via an icon within the web site, whereby clicking on the icon allows a user to bookmark pages directly.

Figure 6A:
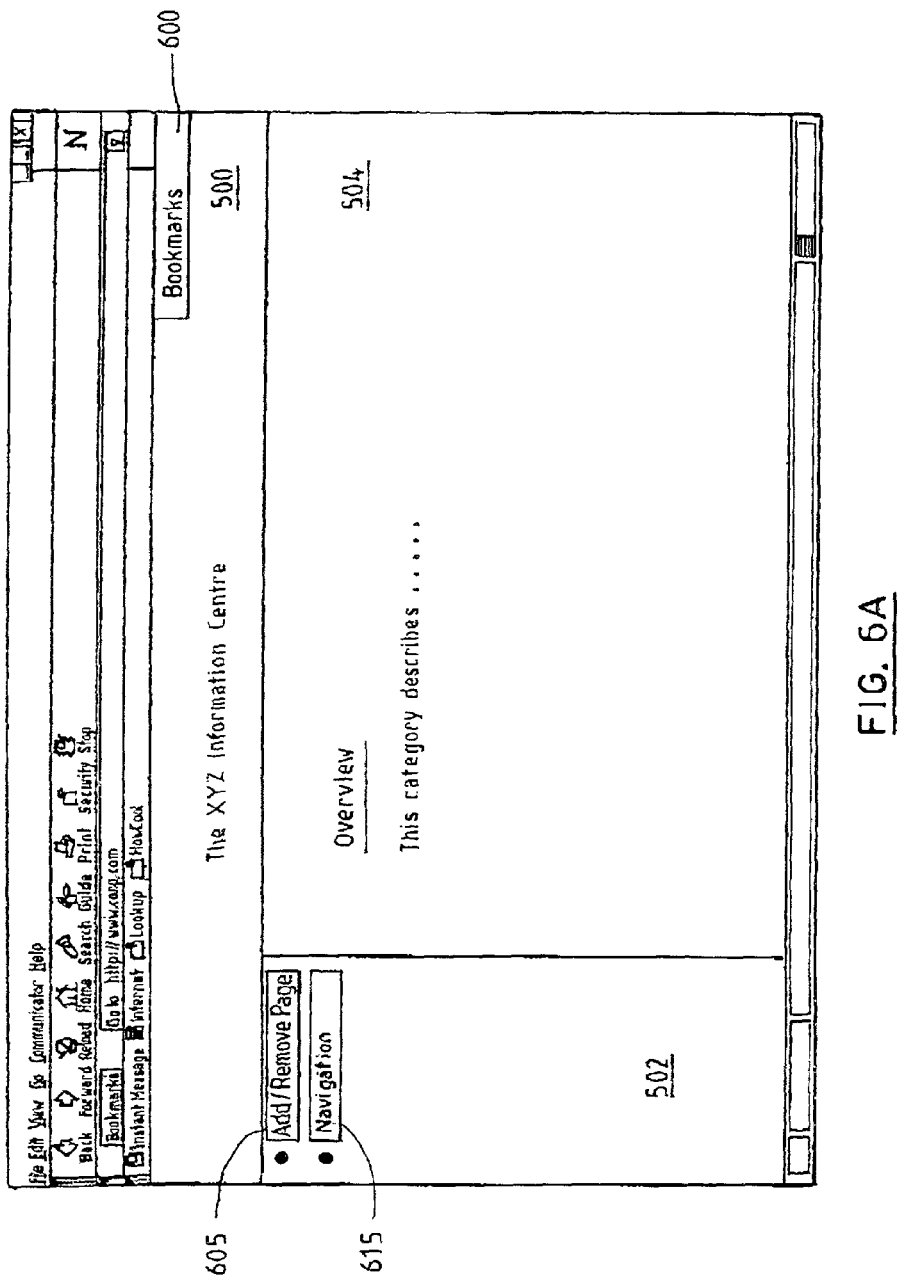
FIG. 6A shows a bookmark function, in accordance with the present invention.

Referring to FIG. 6A, it is assumed that the user has navigated down the navigation tree of the "Tasks" category, to an information unit, namely, "Overview", which is displayed in the right bottom frame (504). In order to bookmark this information unit, in accordance with the present invention, the bookmarking function is activated by clicking on the "Bookmarks" icon (600), which is present within the web site itself. In a preferred implementation selecting this icon causes the navigation bar (502) to be replaced with a document showing a further icon (605), "Add/Remove page", and a list, initially empty, of previously saved bookmarks. Selecting the icon (605) allows a user either to add a bookmark for an information unit currently being displayed in the right bottom frame (504) or to remove a bookmark for an information unit. A "Navigation" icon (615) is also shown in FIG. 6A. Selecting this icon (615) has the effect of restoring the navigation bar (502).

Figure 6B:
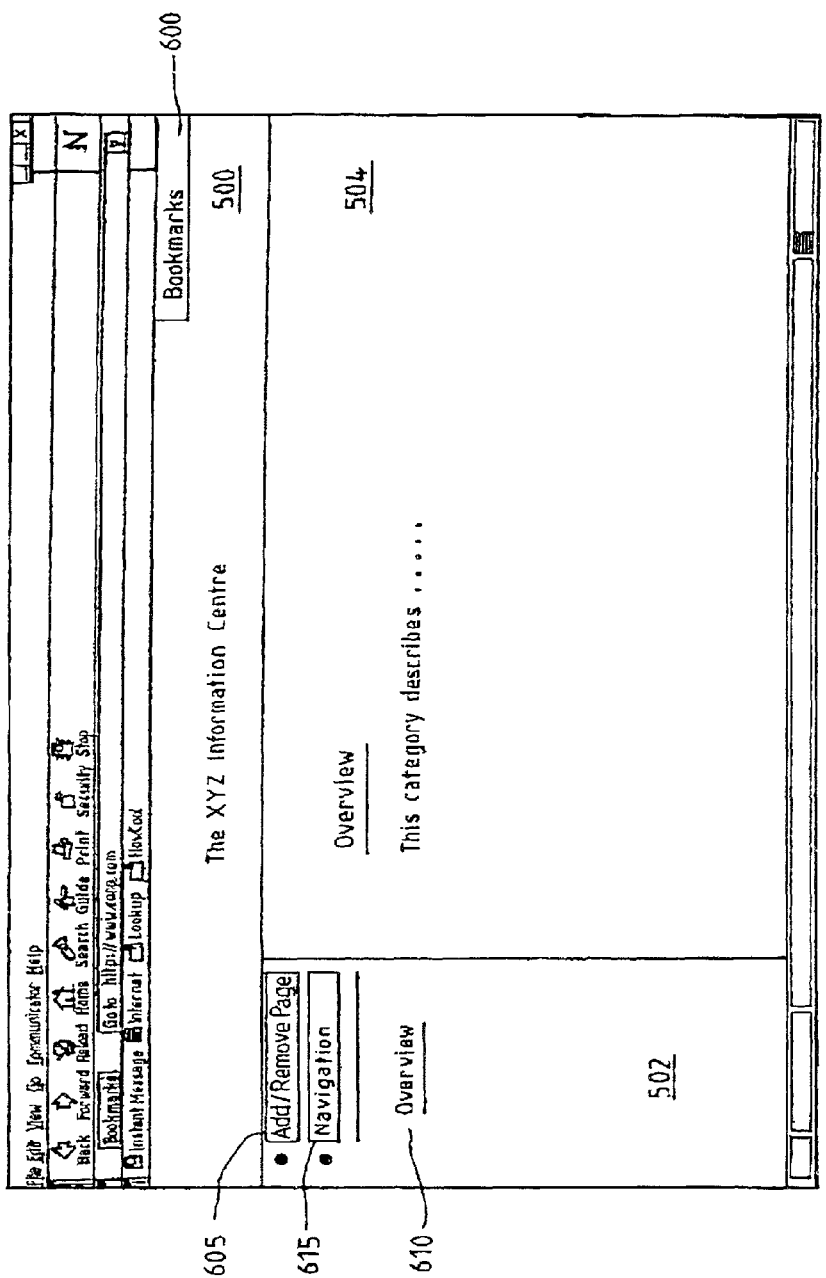
FIG. 6B shows the results of using the bookmark function of FIG. 6A.

In FIG. 6B, a user has added an information unit as a bookmark by utilizing the "Add/Remove page" icon (605). Referring to the navigation bar (502), an item (610), which represents a pointer to that information unit, is added.

In order to retrieve the information unit, preferably, two operations are performed: firstly, a user clicks on the "Bookmarks" icon (600) to display a list of the current bookmarks; secondly, the user clicks on the item (610) associated with that information unit, within the list of bookmarks. The information unit will then be displayed in the right bottom frame (504). It should be understood that once bookmarks have been added to the list, only one operation is needed to retrieve a bookmark.

Advantageously, by allowing a bookmark list to be retained in the navigation bar (502), the user has a comprehensive view of a number of information units (more specifically, pointers to the information units). This overcomes the problem associated with the prior art whereby several operations need to be initiated before information units can be accessed.

Another benefit of the present invention is that the "environment" (e.g. navigational buttons) of the information units is preserved. Therefore the full content of a web page supporting frames is restored upon activation of bookmarking. Advantageously, the format and structure of the web page and the information, functions etc. in related frames are preserved.

The bookmarking feature of the present invention is made available via scripts downloaded from the server machine that is hosting the web page/site. The bookmarks can be stored on the user's client machine or alternatively, an information supplier or content provider can manage bookmarks on behalf of users. In this latter scenario, the bookmarks will be stored at the server machine managed by the information supplier or content provider.

The preferred embodiment of the present invention is implemented in the JavaScript (JavaScript is a trademark of Sun Microsystems Inc.) programming language. Specifically, information associated with each bookmark is held as an item in a JavaScript array. An example of the declaration of an array (named "bookmark") is shown below:

var bookmark=new Array( );

A representation of the array (700) is shown in FIG. 7, whereby an index number (705), "title" (710) and absolute URL (715) are held. The bookmarks to be held in the array are defined by utilising the function "defineBookmark", whereby the associated parameters are the hypertext reference of the bookmark and the title of the bookmark. An example of the function is shown below:

```
function defineBookmark(href, title)
{
    this.href   = href;     //* The href of the topic *//
    this.title  = title;    //* The title of the topic *//
}
```

Figure 8:
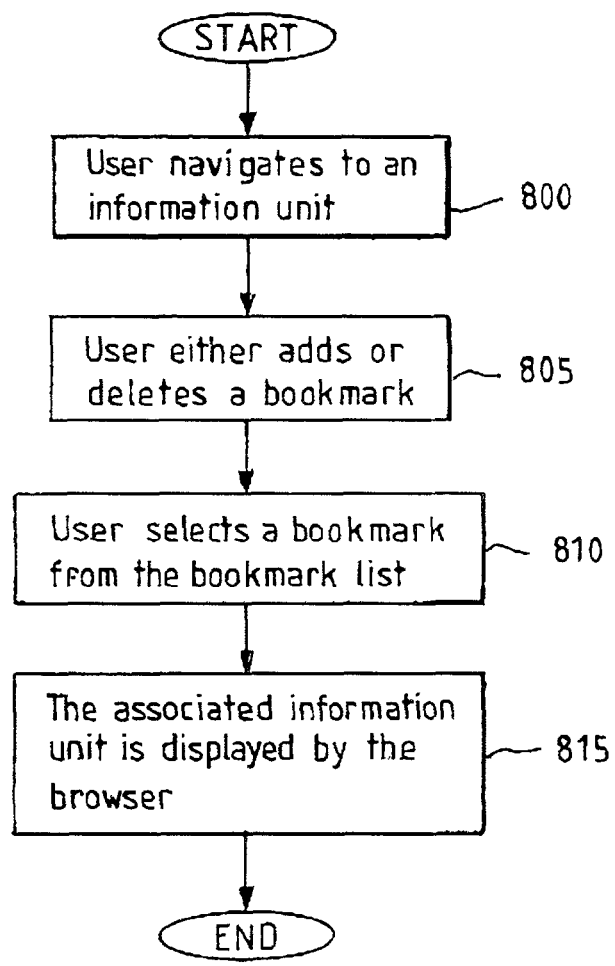
FIG. 8 is a flow chart showing the operational steps involved in one example of bookmarking, according to the present invention.
Figure 9:
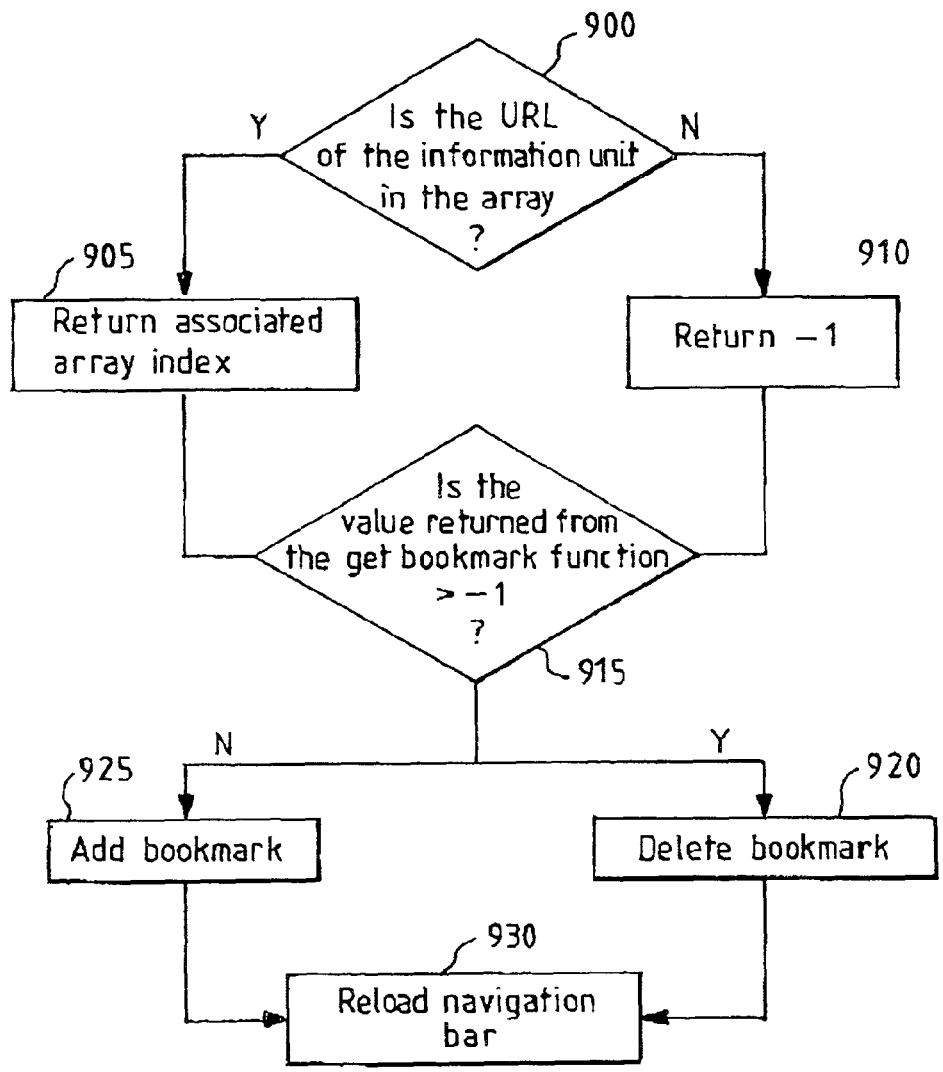
FIG. 9 is a flow chart showing the operational steps involved in adding or deleting a bookmark, according to the present invention.

In FIG. 8, one example of a method of bookmarking, according to the present invention, is shown. Firstly, a user navigates (step 800) to an information unit (i.e. a web page with an associated URL) via navigation operations as described above. For the first pass through the flow of FIG. 8, the process of deleting a bookmark will be described. It is assumed that the user has navigated to the "Overview" information unit, which has an index in the array of "0" (as shown in FIG. 7). Next, the user has the option (step 805) to either add the information unit as a bookmark or to delete an existing bookmark. Preferably, this is implemented by executing the "addRemoveBookmark" function. Step 805 will be described in more detail with 20 reference to FIGS. 9, 10 and 11. FIG. 9 is a flowchart of the operational steps involved in the "addRemoveBookmark" and "getBookmark" function. The program code of the "addRemoveBookmark" function is shown in FIG. 10. The program code of the "getBookmark" function is shown in FIG.

Firstly, the "addRemoveBookmark" function calls the "getBookmark" function. FIG. 10 shows the piece of computer program code executed, whereby "bookmarkNumber" is the index (705) into the array (700) shown in FIG. 7 of the entry containing the URL of the information unit that the user has navigated to. Referring to FIG. 9, the array (700) is analysed to determine (step 900) whether the URL of the information unit that the user has navigated to is present.

If it is determined that the URL is present in the array (700) (positive result to step 900), the associated index in the array is returned (step 905). In this example, the array index "0" is returned. However, if the URL is not found in the array (700), (negative result to step 900), "−1" is returned (step 910). At this point, the "getbookmark" function has completed and the processing returns to the "addRemoveBookmark" function.

As shown in FIG. 9, a check is carried out at step 915, to determine whether the value returned from the "getBookmark" function is more than "−1". If the value returned is more than "−1" (positive result to step 915), then the URL of the information unit has been found in the array (700). In the example, the information unit "Overview" has an index value of "0" which is more than "−1". Therefore, the user has already bookmarked the information unit on a previous visit and it is assumed that the user does not need the bookmark reference and it is deleted (step 920) from the array.

The array (1200) resulting from the deleting operation is shown in FIG. 12.

Referring back to FIG. 9, the navigation bar (502) is reloaded (step 930) by executing the "listBookmarks" function.

An example of the "listBookmarks" function is shown in FIG. 13. The function steps through the array (1200) and for all the index entries that are left, in this case, "1" and "2", the associated bookmark entries are displayed.

For the second pass through the flow of FIG. 8, the process of adding a bookmark will be described. Firstly, a user navigates (step 800) to an information unit. It is assumed that the user has navigated to an information unit entitled "Summary". Next, the user has the option (step 805) to either add the information unit as a bookmark. As before, step 805 will be described in more detail with reference to FIGS. 9, 10 and 11.

Referring to FIG. 9, firstly, the array (700) is analysed to determine (step 900) whether the URL of the information unit that the user has navigated to is present. If it is determined that the URL is present in the array (700) (positive result to step 900), the associated index in the array is returned (step 905). However, as in this example, if the URL is not found in the array (700), (negative result to step 900), "−1" is returned (step 910). At this point, the "getBookmark" function has completed and the processing returns to the "addRemoveBookmark" function.

As shown in FIG. 9, a check is carried out at step 915, to determine whether the value returned from the "getbookmark" function is more than "−1". If the value returned is more than "−1" (positive result to step 915), then the URL of the information unit has been found in the array (700). However in this example, the URL is not present in the array and therefore "−1" has been returned. Therefore, the user has not previously bookmarked this information unit and it is assumed that the user wants to add (step 925) a bookmark to the information unit.

Figure 14:
FIG. 14 shows a representation of an array, following the process of adding a bookmark, according to the present invention.

The bookmark is added as an entry in the array and the resulting array (1400) is shown in FIG. 14.

Referring back to FIG. 9, the navigation bar (502) is reloaded (step 930) by executing the "listBookmarks" function. The function steps through the array (1200) and for all the index entries that are left, in this case, "1", "2" and "3", the associated bookmark entries are displayed.

Referring back to FIG. 8, once an updated bookmark list has been displayed, in this example, a user selects (step 810) a bookmark from the list. In this example, the user is already in the "Bookmarks" area of the information center and therefore, in order to select (step 810) a bookmark, the user clicks on an appropriate item within the list of bookmarks. If the user is in another area of the information center, e.g. the "Tasks" category, it should be understood that in order to select (step 810) a bookmarked information unit, preferably, two operations are performed: firstly, a user clicks on the "Bookmarks" icon to display a list of bookmarks; secondly, the user clicks on an appropriate item within the list of bookmarks. Finally, at step 815 of FIG. 8, the information unit associated with the bookmark that the user selected at step 810, is displayed to the user.

Preferably, the current list of context-sensitive bookmarks is retained for a single session (whereby a session is an instance of a web browser) only. Each time a new session is opened, a new set of bookmarks can be created. Alternatively, in an extension of the present invention, the contents of the array (700) could be stored in a cookie so that it can be retrieved in a future session. In the Internet environment, when a user enters a Web site, the user's client computer sends a request to the Web server. A cookie is a data block that is stored on the user's client computer in the Web browser's cache memory by a Web server. When the user returns to that same Web site, the Web browser can retrieve the cookie and use it to reconstruct the list of bookmarks. Although some users "disable" cookies, some current web browsers allow selective storing of cookies.

Although a single icon (605) has been described for adding or deleting a bookmark, it should be understood that two separate icons could be implemented.

In the preferred embodiment, the bookmarking feature is made available via scripts downloaded from the server machine. Alternatively, the feature could be provided at the client machine, whereby the client machine queries the server machine for data associated with the "structure" of a web page and stores this data locally. Upon retrieving a bookmarked web page, this data allows the content and context of the web page to be displayed. Furthermore, if a web page were to be viewed "offline", by utilising this feature, the frame structure of that web page will be preserved.

It will be apparent from the above description that, by using the techniques of the preferred embodiment, a method of information retrieval is provided. The present invention is advantageous in that contextual and content information of a web page is preserved. Furthermore, the number of operations required to select a bookmarked page is reduced and this is beneficial in many applications. For example, the feature will be useful in making web sites accessible to people with disabilities.

It should be understood that although the present invention is applied to an information centre, any other type of web site could be utilised. For example, any application that delivers web pages using frames will benefit from the features of the present invention.

The invention claimed is:

1. A system for bookmarking and retrieving an information unit within a web page, said system comprises a processor configured to perform:
   navigating to a particular information unit within a web page:
   associating a bookmark to the particular information unit within said web page, including
      clicking a "Bookmarks" icon within the web page;
      displaying an "Add/Remove page" icon and a list of previously saved bookmarks within the web page; and
      selecting the "Add/Remove page" icon to add the bookmark associated with the particular information unit to the list; and
   retrieving the particular information unit, including:
      navigating to the list of bookmarks;
      selecting the bookmark associated with the particular information unit from the list;
      retrieving the particular information unit and displaying the particular information unit within the web page.

2. The system as claimed in claim 1, wherein said bookmark is stored as an item in an array.

3. The system as claimed in claim 2, wherein said item comprises:
   an index number;
   a title associated with said particular information unit within said web page, and
   a Uniform Resource Locator (URL) associated with said particular information unit within said web page.

4. The system as claimed in claim 2, wherein said array is stored for one instantiation of a web browsing application.

5. The system as claimed in claim 2, wherein said array is stored for more than one instantiation of a web browsing application.

6. The system as claimed in claim 1, wherein said retrieved particular information unit is displayed in a data display area within the web page.

7. The system as claimed in claim 1, the processor is further configured to perform the step of deleting a bookmark from the list.

8. A method of bookmarking and retrieving an information unit within a web page, said method comprising the steps of:
   navigating to a particular information unit within a web page:
   associating a bookmark to the particular information unit within said web page, including
      clicking a "Bookmarks" icon within the web page;
      displaying an "Add/Remove page" icon and a list of previously saved bookmarks within the web page; and
      selecting the "Add/Remove page" icon to add the bookmark associated with the particular information unit to the list; and
   retrieving the particular information unit, including:
      navigating to the list of bookmarks;
      selecting the bookmark associated with the particular information unit from the list;
      retrieving the particular information unit and displaying the particular information unit within the web page.

9. The method as claimed in claim 8, wherein said bookmark is stored as an item in an array.

10. The method as claimed in claim 9, wherein said item comprises:
   an index number;
   a title associated with said particular information unit within said web page, and
   a Uniform Resource Locator (URL) associated with said particular information unit within said web page.

11. The method as claimed in claim 9, wherein said array is stored for one instantiation of a web browsing application.

12. The method as claimed in claim 9, wherein said array is stored for more than one instantiation of a web browsing application.

13. The method as claimed in claim 8, wherein said retrieved particular information unit is displayed in a data display area within the web page.

14. The method as claimed in claim 8, further comprising the step of deleting a bookmark from the list.

15. A computer program product in a computer readable storage medium, for bookmarking and retrieving an information unit within a web page, the computer readable storage medium having stored thereon computer program code, which when executed by a computer, causes the computer to perform the steps of:
   navigating to a particular information unit within a web page:
   associating a bookmark to the particular information unit within said web page, including
      clicking a "Bookmarks" icon within the web page;
      displaying an "Add/Remove page" icon and a list of previously saved bookmarks within the web page; and
      selecting the "Add/Remove page" icon to add the bookmark associated with the particular information unit to the list; and
   retrieving the particular information unit, including:
      navigating to the list of bookmarks;
      selecting the bookmark associated with the particular information unit from the list;
      retrieving the particular information unit and displaying the particular information unit within the web page.

* * * * *